June 29, 1965   J. P. BURGARELLA ETAL   3,191,511
PHOTOGRAPHIC APPARATUS

Filed March 29, 1963   3 Sheets-Sheet 2

INVENTORS
John P. Burgarella
BY Milton S. Dietz
Brown and Mikulka
ATTORNEYS

United States Patent Office
3,191,511
Patented June 29, 1965

3,191,511
PHOTOGRAPHIC APPARATUS
John P. Burgarella, Sudbury, and Milton S. Dietz, Lexington, Mass., assignors to Polaroid Corporation, Cambridge, Mass., a corporation of Delaware
Filed Mar. 29, 1963, Ser. No. 269,002
14 Claims. (Cl. 95—10)

The present invention relates to photography and, more specifically, to exposure control apparatus wherein the duration of exposure is automatically controlled by the operation of a circuit which is responsive to the intensity of illumination received from the scene being photographed.

A photographic shutter mechanism having a pair of blades movable with respect to an aperture to initiate and terminate a photographic exposure therethrough is disclosed in the instant application. A switching circuit is provided to establish a time interval which accurately controls the duration of the exposure in response to the intensity of scene brightness. The electrical parameters of the circuit are established in such a manner that the time interval produces an exposure duration which is calculated to result in proper exposure of a photosensitive film, or the like, with regard to the relative sensitivity of the film, the intensity of brightness received thereby from the scene being photographed, and the size of the aperture through which exposure is effected. Means are provided for retaining the blades in an initial position, for releasing a first blade to initiate the exposure, for initiating the timing operation of the circuit, and for releasing a second blade to terminate exposure in response to termination of the time interval established by the circuit. The latch which releases the first blade for movement to the exposure-initiating position also serves, in the course of its unlatching movement, to actuate the circuit to commence the timing operation. Means are also provided for insuring that this latch is moved sharply to effect a quick, clean opening of a switch which initiates timing in exact and repeatable synchronization with release of the first blade.

It is a principal object of the present invention to provide novel and improved means for releasing shutter elements to initiate an exposure and for initiating a timing operation which establishes exposure duration in an exactly synchronized and repeatable manner.

A further object is to provide, in a shutter mechanism having a blade which is held in an initial position by an electromagnet upon energization thereof, novel means for retaining the blade, or an element associated therewith, in close contact with the electromagnet until such energization.

Another object is to provide a photographic exposure control device having an improved latching arrangement for retaining elements of the device in initial positions and which results in repeatable and reliable operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The present invention comprehends a novel shutter mechanism which includes a pair of solid shutter blades constructed and arranged for covering and uncovering an exposure aperture. In order to effect exposure, one of the shutter blades is positioned in covering relation to the exposure aperture and is movable to an uncovering position relative thereto to initiate exposure. The other shutter blade is initially positioned to one side of the aperture and is movable, subsequent to movement of the first blade, to a covering position with respect to the aperture for terminating exposure therethrough. The operation of the shutter blades in sequence to effect an exposure is controlled by the operation of an electronic switching circuit which controls a flow of electrical current to energize and deenergize a solenoid which forms a part of an electromagnet. The exposure provided by the shutter is a function of the intensity of light received from the scene being photographed. Therefore, the circuit includes photoresponsive means for varying electrical parameters of the circuit in response to variations in the intensity of such light.

Figure 1:
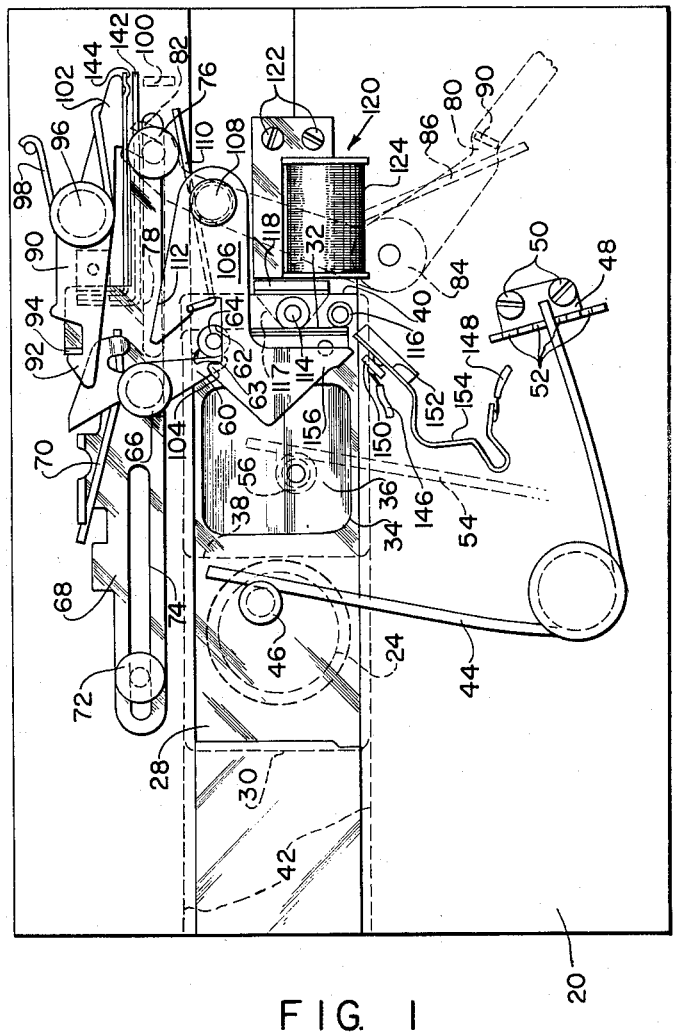
FIGURE 1 is a somewhat diagrammatic, plan view of a photographic shutter assembly embodying the present invention, the shutter housing being removed and the shutter being viewed from the side normally facing the exposure plane of a camera, the various elements of the shutter being shown in the initial or cocked position.
Figure 4:
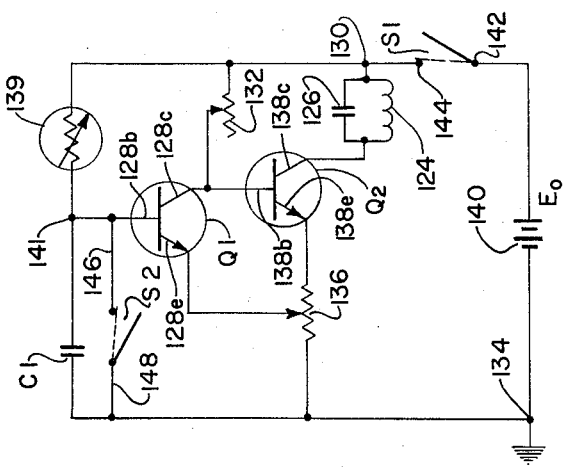
FIG. 4 is a schematic circuit diagram of an electrical circuit adapted to be associated with the shutter mechanism of the invention and to serve as a means for establishing a time interval determinative of the duration of exposures effected by the shutter.

Referring now to the drawings, like reference numerals are used to denote like parts among the several figures including the schematic counterparts in the circuit diagram of FIG. 4 of elements which are physically shown in other figures. Foundation means, such as base portion 20, is provided for mounting the operative elements of the shutter mechanism. Positioned in alignment with the optical axis of a photographic camera (not shown) with which the shutter apparatus of the present invention is adapted to be associated is aperture 24 which may be formed in base portion 20 or by other means previously used for such purposes. As shown in FIGURE 1, aperture 24 is covered by first shutter blade 28 which effectively occludes passage of light through the aperture. First shutter blade 28 includes leading edge 30, trailing edge 32, and opening 34 which, in the embodiment shown, is substantially square or rectangular in shape. Second shutter blade 36 includes leading edge 38 and trailing edge 40. It may be seen that in the position of FIGURE 1 leading edge 38 of second shutter blade 36 is positioned to one side of aperture 24 and is therefore in uncovering relation to the aperture.

Both first and second blades 28 and 36 are mounted for reciprocal sliding movement in tracks 42 which are provided in base portion 20. First blade 28 is biased for movement from right to left as seen in in FIGURE 1 by spring 44. One end of spring 44 bears against fixed pin 46 on first blade 28, and the other end is held stationary by stop means 48 which are anchored to base portion 20 by screws 50. Stop means 48 include a plurality of teeth 52. The stationary end of spring 44 may be positioned between any two of teeth 52 to allow selective adjustment of the biasing force of spring 44 on first blade 28. Second blade 36 is biased from right to left as seen in FIGURE 1 by spring 54 which bears on fixed pin 56, extending from second blade 36 on the side thereof opposite first blade 28. Spring 54 extends from its biasing contact with pin 56 around a fixed mounting and is held stationary at the other end by appropriate stop means (not shown) on base portion 20.

First blade 28 is retained in the position of FIGURE 1 by contact of ear portion 60 with large diameter 62 of fixed pin 63 which extends from first blade 28, and also includes small diameter 64, extending outwardly from the blade a greater distance than large diameter 62. Ear 60 is pivotally mounted upon pin 66 on release slide 68, and biased in a clockwise direction, as seen in FIGURE 1, about pin 66 by spring 70. The bias of spring 70 on ear portion 60 is preferably stronger than the bias of spring 44 on pin 46, whereby first blade 28 is retained in the position shown in FIGURE 1 by the force of ear portion 60 on large diameter 62; that is, the force of spring 44, acting through pin 63 on ear 60, is not strong enough to result in counterclockwise rotation of ear 60 against the bias of spring 70.

Figure 2:
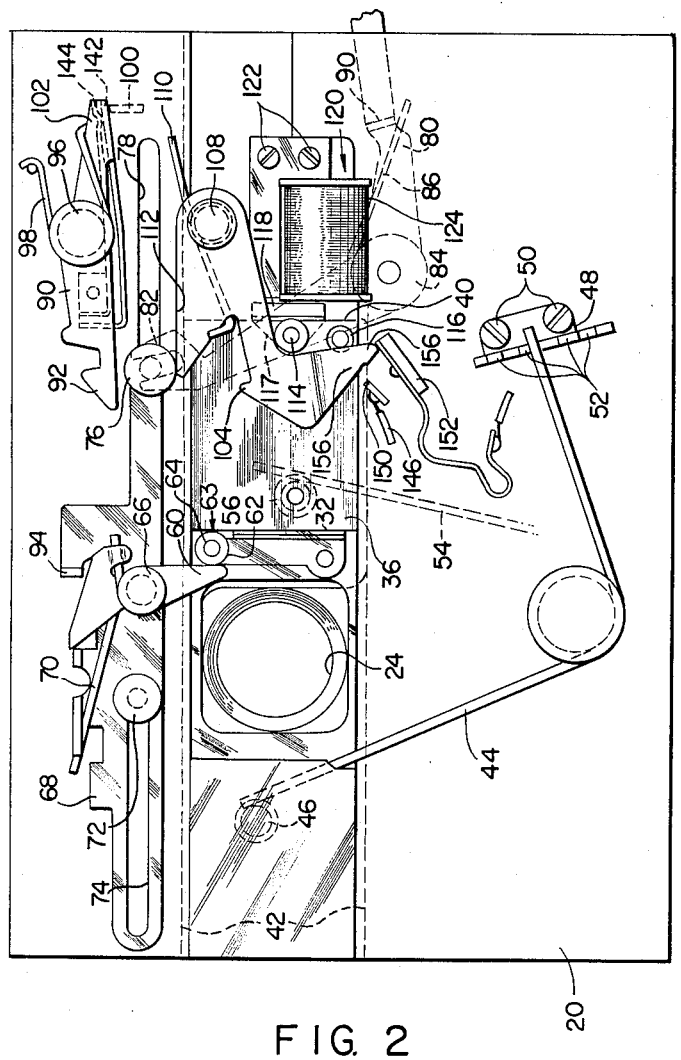
FIG. 2 is also a plan view of the shutter of FIGURE 1, the elements being shown in the exposure position, that is, with the exposure aperture uncovered to permit passage of light.
Figure 3:
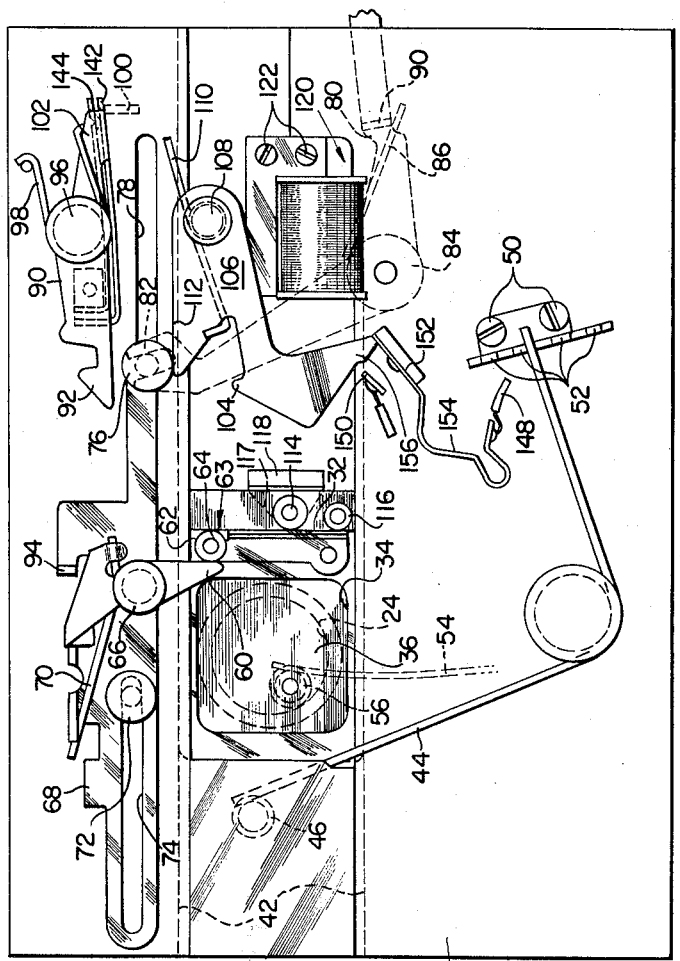
FIG. 3 is also a plan view of the shutter in FIGS. 1 and 2, the elements being shown in the terminal or rest position.

Release slide 68 is mounted for reciprocal sliding movement upon fixed pin 72 which extends from base portion 20 through elongated slot 74 in release slide 68, and fixed pin 76 which extends from release slide 68 through elongated slot 78 in base portion 20. The end of pin 76 opposite that shown in FIGURE 1 extends through base portion 20 and is engaged by end portion 82 of cocking lever 80. Cocking lever 80 is pivotally mounted upon fixed pin 84, which extends from base portion 20, and is biased for movement about pin 84 in a counterclockwise direction, as seen in FIGS. 1–3, by spring 86. A fixed pin (not shown) on base portion 20 provides a fixed stop for one end of spring 86, which passes around pin 84 and engages, at its other end, extending portion 90 of cocking lever 80.

Thus, it may be seen that the biasing force exerted by spring 86 will be transmitted, through cocking lever 80, to pin 76 and therefore to release slide 68. When in the position of FIGURE 1, release slide 68 is consequently biased for movement from right to left as seen in this figure. Release slide 68 is retained in the position of FIGURE 1 by rotatable element 90, including latching portion 92 which engages tab 94 on release slide 68. Rotatable element 90 is mounted upon pin 96, extending from base portion 20 and is biased toward clockwise movement thereabout, as seen in FIGURE 1, by spring 98.

Exposure-initiating movement of the shutter elements is commenced by rotating element 90 in a counterclockwise direction about its pivotal mounting on pin 96, whereby latching portion 92 releases tab 94 and release slide 68 is free to move, as seen in FIGURE 1, under the biasing force of spring 86, transmitted to the release slide through cocking lever 80. Any convenient means previously known in the art may be used to move rotatable element 90 for setting the parts in motion to initiate exposure. For example, the camera with which the shutter of the present invention is associated may be provided with the usual, manually-engageable shutter release member, such as a depressible button or the like. Such shutter release member may comprise, or may be operatively connected to, movable member 100, which is shown diagrammatically in dotted lines in FIGS. 1–3. Movable member 100 may be associated in any well-known manner with the shutter elements for movement between the positions of FIGS. 1 and 2 in response to manual movement by the operator of the manually engageable shutter release member. For example, a conventional cable release may lead from a depressible button to engage member 100. Manual movement of the button is transmitted through the cable to member 100 and any well-known means may be provided to return the elements to their original positions when released.

As may be seen from FIG. 2, movable element 100 is adapted to engage tail portion 102 of rotatable element 90, and move the element so that the latching portion 92 becomes disengaged from tab 94 on release slide 68. Upon such disengagement, release slide 68 moves from the position of FIGURE 1 towards the position of FIG. 2 by virtue of the force exerted on pin 76 by spring-biased cocking lever 80. As release slide 68 begins to move, first blade 28 moves therewith since ear portion 60, which initially retains the first blade in its initial position, moves with the release slide, and first blade 28 is biased by spring 44. Small diameter 64 of fixed pin 63 extending from first blade 28 is engaged by latching portion 104 of element 106 which is pivotally mounted on pin 108, extending from base portion 20. Element 106 is biased towards clockwise rotation about pin 108 by spring 110. As release slide 68 continues to move from right to left the periphery of pin 76 engages surface 112 of element 106 and rotates the element in a counterclockwise direction about its pivotal mounting on pin 108 against the bias of spring 110. This rotation of element 106 causes latching portion 104 thereof to release small diameter 64 of fixed pin 63, thus releasing first blade 28 for movement, under the bias of spring 44, to the position of FIG. 2. Appropriate means (not shown) are provided on base portion 20 for stopping first blade 28 in the position of FIG. 2. When first blade 28 has been moved to the position of FIG. 2 opening 34 is in registration with aperture 24, permitting the passage of light therethrough.

When first blade 28 is retained in its position of FIGURE 1, by the means previously described, second blade 36 is retained in its initial position against the bias of spring 54 by contact of trailing edge 32 of first blade 28 with pins 114 and 116 on second blade 36. Pin 114 also serves as a pivotal mounting for element 117 which includes keeper 118, extending beyond trailing edge 40 of second blade 36. When in the position of FIGURE 1 keeper 118 is held in contact with the pole pieces of electromagnet 120, which is secured to base portion 20 by means of screws 122. Electromagnet 120 may be energized to exert a magnetic attraction on keeper 118 by passage of an electrical current through solenoid 124. The circuit diagram of FIG. 4 includes a schematic showing of solenoid 124 and the flow of energizing current through the solenoid is controlled by operation of the circuit, which will be explained in greater detail hereinafter. Thus, when first blade 28 moves to its position of FIG. 2, second blade 36 may be retained in its initial position by supplying an energizing current to solenoid 124 which causes electromagnet 120 to attract keeper 118. When the current to solenoid 124 is cut off, or is diminished to such an extent that the attracting force of electromagnet 120 on keeper 118 is less than the biasing force of spring 54 on pin 56, second blade 36 will be moved under the bias of spring 54 to its position of FIG. 3. Second blade 36, when in the position of FIG. 3, covers aperture 24, thus terminating the exposure which was initiated by movement of first blade 28 from its position of FIGURE 1 to that of FIG. 2.

The operation of the circuit shown schematically in FIG. 4 to control the duration of exposures effected by the shutter mechanism will now be explained. As previously mentioned, solenoid 124 comprises a portion of electromagnet 120 which is adapted to retain second blade 36 in its position after first blade 28 has been released. Premature release of second blade 36 by reducing the energizing current through solenoid 124 is prevented, and accurate control of the time for which second blade 36 is retained in its initial position is obtained by rapidly energizing the solenoid just prior to release of first blade 28, and effecting a rapid release of second blade 36 at the proper time. Solenoid 124 must be energized before first blade 28 begins to move away from its position of FIGURE 1 because this blade, through contact of trailing edge 32 thereof with pins 114 and 116 on closing blade 36, serves initially to position keeper 118 in engagement with the pole pieces of electromagnet 120. Once the keeper has separated even slightly from the pole pieces, the reluctance of the magnetic circuit is so high that the solenoid current is unable to produce an attractive force that will overcome the bias of spring 54 which urges second blade 36 away from its initial position.

Rapid release of the second blade 36 by electromagnet 120 can be accomplished by rapidly decreasing the current furnished to solenoid 124. When the current furnished to the solenoid is rapidly reduced, a voltage is induced thereacross due to the inductance of the solenoid. The induced voltage charges capacitor 126 which shunts the solenoid and prevents the induced voltage from damaging transistor $Q_2$. The current in the solenoid, however, rapidly decays to the point where the magnetic induction is so reduced that the force of attraction of the pole pieces on keeper 118 is equal to the spring force urging separation. At this point, there is an initial movement of keeper 118 as second blade 36 is drawn away from the position of FIGURE 1 by the bias of spring 54. The time between the instant that the current in solenoid 124 is rapidly reduced and the instant that release of second blade 36 is accomplished is very small in terms of the ordinary exposure interval, being only a fraction of a millisecond. For this reason, it is considered that the current through the solenoid is reduced, and movement of the second blade 36 begins at substantially the same time.

For the reasons set forth above, namely rapid switching of the current input to the solenoid and low power consumption, the shutter timing apparatus takes the form of a transistorized, two-stage, modified Schmitt-type trigger circuit responsive to the output voltage from a selectively adjustable timing circuit for controlling the actuation and deactuation of electromagnet 120. The voltage sensitive trigger circuit has a normally not-conducting stage that includes transistor $Q_1$ having base, collector and emitter electrodes 128b, 128c and 128e respectively. Collector electrode 128c of $Q_1$ is connected to terminal 130 of the shutter timing apparatus by variable bias resistor 132, and emitter electrode 128e of $Q_1$ is connected to terminal 134 of the shutter timing apparatus by variable bias resistor 136. The normally conducting stage of the circuit includes transistor $Q_2$ having base, collector and emitter electrodes 138b, 138c and 138e. Collector electrode 138c is connected to terminal 130 through solenoid 124 so that the latter is energized when $Q_2$ conducts. Base electrode 138b of $Q_2$ is connected to collector electrode 128c of $Q_1$, and emitter electrode 138e of $Q_2$ is connected through bias resistor 136 to terminal 134. It should be noted that with this arrangement there is essentially a common emitter resistor, the adjustment to resistor 136 being for the purpose of establishing the voltage at which it is desired to trigger the circuit. While the two stages of the circuit have been characterized as "normally not-conducting" and "normally-conducting" it should be obvious that this characterization is applicable only when a voltage source is applied across terminals 130 and 134.

A timing network of the circuit of FIG. 4 comprises R-C circuit means which includes photoconductive element 139 and capacitor $C_1$, in series therewith. Element 139 may be a cadmium sulfide photocell or the like, arranged to receive light from the scene being photographed and having a resistance functionally related to the intensity of light incident thereon. The timing network comprising photoconductive element 139 and capacitor $C_1$ is connected between terminals 130 and 134 of the circuit so as to form a conventional integrator circuit whose input terminal is at 130 and whose output terminal is at 141, the connection between the photoconductive element and the capacitance.

Voltage source 140, shown in the form of a battery of potential $E_0$, is connected between terminals 130 and 134 through normally open switch S1 so as to minimize current drain on the battery. Referring again to FIGURE 1, a pair of switch contacts 142 and 144 may be seen in proximity to tail portion 102 of element 90. These two contacts form switch S1 and may be seen to be open in the position of FIGURE 1, when the shutter is in the cocked position. As movable member 100 is moved to contact tail portion 102, it also moves contact 142 into engagement with contact 144, thus closing switch S1. The ends of the contacts are freely movable, of course, and are formed of a suitable conducting material, such as a springy metal, which causes them to return under their own force to the position of FIGURE 1 when member 100 is removed from contact therewith.

Lead 146 extends frm a connection between output terminal 141 and base electrode 128b of $Q_1$, through normally closed switch S2, to lead 148 which is connected to terminal 134. Referring again to FIGURE 1, a pair of switch contacts 150 and 152, which form switch S2, are connected to leads 146 and 148 respectively. Contact 152 is on the movable end of spring 154, which is anchored at the other end to base portion 20 and may also form a part of the electrical circuit, connecting contact 152 to lead 148. Element 106 includes tail portion 156 which is adapted to engage and move contact 152, thus opening switch S2, when element 106 is moved from its position of FIGURE 1 to that of FIG. 2 through the previously-explained action of release slide 68. It may thus be seen that switch S2 is opened by tail portion 156 substantially simultaneously with release of small diameter 64 of the fixed pin on first blade 28 by latching portion 104.

The sequence of events that occur as a result of movement of element 100 from the position of FIGURE 1 to that of FIG. 2 will now be explained. The initial movement of element 100 closes the contacts of switch S1 before the rotation imparted to element 90 effects disengagement of latch portion 92 from tab 94 of release slide 68. Since human reaction time involved in moving the shutter release member, namely the time to move the member and release it, and the inertial delay of the member in returning to its normal position, substantially exceeds the longest average exposure apt to be used under normal "snap-shot" conditions of scene brightness, the contacts of switch S1 will be closed for at least as long as the correct exposure time.

$Q_2$ conducts almost instantaneously with the closing of switch S1 since the stage including $Q_2$ is essentially a common-emitter configuration utilizing fixed base current bias. The setting of variable resistor 132 establishes the degree to which $Q_2$ conducts so that current through solenoid 124 can be adjusted to provide the proper magnetomotive force in the magnetic circuit of electromagnet 120 for preventing accidental release of second blade 36 when the first blade moves to initiate exposure. The flow of current through resistors 132 and 136, when $Q_2$ conducts, establishes at the collector and emitter electrodes of $Q_1$, bias voltages having first values dependent upon the magnitudes of the respective currents and resistance values.

Until the initial displacement of first blade 28 out of its initial position, switch S2 is closed, as preveiously explained. Connection 141 is at an initial value of voltage, namely ground potential, at the instant S1 is closed. When the voltage at connection 141 is at its initial value, and the voltages at the collector and emitter electrodes of $Q_1$ are at their first values of bias voltage due to the conduction of $Q_2$, the collector-base and emitter-base junctions of $Q_1$ are reverse biased, thus resulting in $Q_1$ being cut off.

Meanwhile, the current through solenoid 124 builds rapidly to its maximum value causing the maximum retaining force to be exerted on the second blade 36 shortly after S1 is closed and just prior to release of first blade 28 for movement out of its position of FIGURE 1. The movement of element 106 to release first blade 28 also moves contact 152 of switch S2, thereby opening the same to apply the voltage source across the timing network. The opening of switch S2 thus activates the timing network and causes the latter to generate at connection 141, a time variable voltage that changes from an initial voltage when the network is activated, to a preselected voltage, termed the trigger voltage, in a period of time termed the trigger generation time of the R-C circuit. The trigger voltage is the voltage at which the emitter-base junction of $Q_1$ is forward biased, and until the voltage at connection 141 reaches the trigger voltage, the first value of the bias voltage at resistor 136 reverse biases $Q_1$ to cut off, and $Q_2$ conducts. When the R-C circuit consists of a timing network which includes only element 139 and capacitor $C_1$, the time $t$ required to reach the trigger voltage $V_1$ is given by the following:

$$t = RC \ln \frac{1}{1 - \frac{V_1}{E_0}} \quad (1)$$

where R is the resistance of element 194 as established by the level of scene brightness, C is the capacitance of capacitor $C_1$, and $E_0$ is the battery voltage. The time $t$, or the time for the series combination of the photoconductive element and capacitor means to generate the trigger voltage is termed the "network time." Thus, the trigger generation time of the R-C circuit when the latter consists only of the series combination of the element and capacitor means is the network time. It will be obvious to those skilled in the art that other combinations of photoconductive element and capacitor means could be used to generate the required trigger voltage.

During the time that the timing network is generating the trigger voltage, first blade 28 moves to unblocking position and initiates exposure since the conduction of $Q_2$ causes a current to flow in solenoid 124 that maintains the second blade 36 in its initial position as shown in FIG. 2. Therefore, it may be said that electromagnet 120 is energized to cause the shutter means to initiate exposure. When the voltage at connection 141 reaches the preselected value, it forward biases the emitter-base junction of $Q_1$, and the latter begins to conduct. Initially, the increased collector current of $Q_1$ flowing through bias resistor 132 increases the voltage drop thereacross to lower the voltage at base electrode 138$b$ of $Q_2$. This reduces the forward bias on $Q_2$, decreasing the flow of current through the latter causing the voltage drop across bias resistor 136 to decrease, thereby increasing the forward bias of $Q_1$ even more. This regenerative feedback between the stages of the voltage sensitive trigger circuit causes conduction to switch rapidly from $Q_2$ to $Q_1$, and the different flow of current through bias resistors 132 and 136 after the switching takes place establishing second values of the bias voltages at electrodes 128$c$ and 128$e$ of $Q_1$. Thus, the conduction of $Q_2$ is severely and radily reduced by the second values of the bias voltages, thereby rapidy deenergizing solenoid 124 to effect a sharp release of second blade 36 as previously described.

When second blade 36 is released, it begins to move out of its initial position and will terminate exposure at its blocking position, as shown in FIG. 3. Second blade 36 will be stopped in its position of FIG. 3 by contact of pins 114 and 116 with trailing edge 32 of first blade 28. It can be seen that the time interval between when timing starts (the opening of S2) and when timing stops (the trigger voltage is reached), will be exactly the same as the time interval between when exposure is initiated and when exposure is terminated, provided that the opening blade delay (i.e., the time between opening of S2 and actual initiation of exposure) is the same as the closing blade delay (i.e., the time between reaching trigger voltage and actual termination of exposure), even though the two time intervals are not concurrent throughout. This disclosure assumes the delay times are essentially the same, so that the actual exposure time is essentially the same as the trigger generation time.

It may thus be seen how the shutter elements move to effect an exposure in response to manual actuation by the operator and how the duration of the exposure is controlled automatically by the operation of the trigger circuit. After the exposure has been terminated, the elements are in the position shown in FIG. 3. Cocking lever 80 rotates, as release slide 68 is moved, to its position of FIG. 2. In order to return the elements to their initial position of FIGURE 1, the operator manually engages an end portion (not shown) of cocking lever 80 which extends past the edge of base portion 20, and rotates the lever in a clockwise direction, as seen in FIGS. 1–3, against the bias of spring 86. End portion 82 is in engagement with pin 76, whereby release slide 68 is moved from left to right, as seen in FIGS. 1–3. Ear portion 60 engages large diameter 62 of fixed pin 63 to move first blade 28 with release slide 68. Trailing edge 32 of the first blade bears against pins 114 and 116 on second blade 36 to move the second blade. As pin 76 is moved out of contact with surface 112, rotatable element 106 is returned to its position of FIGURE 1 by the biasing force of spring 110. The bias of spring 154 returns contact 152 into engagement with contact 150, thus closing switch S2. Tab 94 overrides latching portion 92 to rotate element 90 slightly, against the bias of spring 98, until the tab has passed the latching portion and is again engaged thereby. Small diameter 64 may override latching portion 104 in the same manner.

It should be noted that the relative mounting and arrangement of parts allows for a slight override to prevent damage to the elements in the event that cocking lever 80 is rotated farther than is actually necessary to latch the parts in their initial positions. This also allows wider tolerances in the manufacture and assembly of certain elements of the shutter. Additional rotation of cocking lever 80 after latching portion 92 has engaged tab 94 may move release slide 68 slightly farther to the right than the position shown in FIGURE 1. Since ear portion 60 is pivotally mounted, however, this additional movement of the release slide will result only in rotation of the ear portion about its mounting on pin 66, against the bias of spring 70, since the shutter blades cannot be moved further. That is, one end of ear 60 bears on large diameter 62 of the fixed pin extending from first blade 28; trailing edge 32 of the first blade bears on pins 114 and 116 of second blade 36; and keeper 118, which is attached to the second blade, is in contact with the pole pieces of electromagnet 120, which is anchored to base portion 20. The relatively strong spring bias on ear portion 60, acting through the first blade, also insures that keeper 118 is held in tight contact with electromagnet 120 when the elements are in the initial position of FIGURE 1.

Since the time for which second blade 36 is retained in uncovering position relative to the exposure aperture after first blade 28 has been released to uncover the aperture is determined by the trigger generation time of the circuit, it is important that the release of the first blade and initiation of the trigger generation time be effected in synchronization. Both of these functions are accomplished in the illustrated embodiment of the present invention through movement of element 106 by pin 76 on release slide 68. Since the trigger generation time is initiated by the opening of switch S2 it is essential that a clean, noise-free break of the switch contacts be effected. This is insured by the fact that element 106 is moved to open switch S2 by the rapid movement of release slide 68, which also provides repeatable operation of the device. That is, since both the first blade is released and switch S2 is opened by the movement of element 106, which is accomplished in a rapid manner by movement of the release slide, the relative position of the first blade to the exposure aperture will be exactly the same each time release is effected, and the time at which switch S2 is opened will be in the same relationship to the time at which exposure is initiated. The member which effects movement of element 106 to release the opening blade and initiate the timing operation, i.e., release slide 68, is held in an initial position by the latch which is released by movement of the shutter release member. Whether this member is moved rapidly or slowly to release the latch from the release slide, the slide will always be moving at substantially the same speed when it moves element 106. The novel construction and arrangement of the various elements comprising the invention therefore result in reliable and repeatable operation of the automatic exposure control device.

Since certain changes may be made in the above apparatus without departing from the scope of the invention herein involved, it is intended that all matter containetd in the above description or shown in the accompanying drawings shall be interpreted as illustrative and not in a limiting sense.

What is claimed is:

1. In a camera having an exposure aperture, a shutter mechanism comprising:
   (a) a shutter blade movable between a cocked position and a rest position;
   (b) first bias means urging said shutter blade toward said rest position;
   (c) first retaining means effective to hold said shutter blade in said cocked position;
   (d) release means mounted for movement in first and second directions;
   (e) second bias means urging said release means toward movement in said first direction;
   (f) second retaining means effective to hold said release means, when the latter is moved in said second direction to a predetermined position, against movement in said first direction;
   (g) manually operable actuating means effective to release said second retaining means, thereby permitting movement of said release means in said first direction;
   (h) means associated with said release means and effective to release said first retaining means in response to movement of said release means in said first direction;
   (i) manually operable cocking means effective to move said release means in said second direction;
   (j) an element mounted on said release means and arranged to move said shutter blade from said rest to said cocked position as said release means is moved in said second direction; and
   (k) means for so connecting said element to said release means that the latter may continue to be moved in said second direction after said shutter blade reaches its terminal cocked position, thereby allowing for overtravel in the manual cocking operation without danger or damage.

2. A shutter mechanism in accordance with claim 1 wherein said element is mounted on said release means for movement therewith and for independent movement relative thereto and is biased toward independent movement in the direction of contact with said shutter blade.

3. A shutter mechanism in accordance with claim 2 wherein said release means is linearly reciprocable and said element is pivotally mounted thereon.

4. A shutter mechanism in accordance with claim 3 wherein said shutter blade reaches said terminal cocked position and is held by said first retaining means before said release means has been moved to said predetermined position, and further movement of said release means causes movement of said element about its pivotal mounting against the biasing force thereon, whereby said biasing force is applied through said element to said shutter blade, urging the latter into its terminal cocked position.

5. In a camera having a housing and an exposure aperture, a shutter mechanism comprising:
   (a) first and second shutter blades movable on said housing, each blade having a blocking terminal position and an unblocking terminal position relative to said aperture for controlling the passage of incident light therethrough;
   (b) bias means associated with each of said blades for urging the first blade toward its unblocking terminal position and the second blade toward its blocking terminal position;
   (c) a release slide mounted on said housing for sliding movement in opposite directions;
   (d) an ear on said release slide engageable with said first blade to move the latter toward its blocking position against the action of the bias means associated therewith when said slide is moved in one direction;
   (e) manually operable cocking means for moving said release slide in said one direction at least until said first blade reaches its blocking terminal position;
   (f) means on said first blade engageable with said second blade to move the latter to its unblocking terminal position when said first blade is moved to its blocking terminal position;
   (g) keeper means on said second blade;
   (h) a solenoid operably associated with a pole piece and so mounted on said housing that said keeper means engages said pole piece and completes therewith a magnetic circuit when said second blade is in its unblocking terminal position whereby energization of said solenoid creates a magnetic force on said keeper that is sufficient to maintain said second blade in its unblocking terminal position; and
   (i) means connecting said ear to said release slide to effect further movement of the latter in said one direction in response to further manual operation of said cocking means after said first blade reaches its blocking terminal position and said second blade reaches its unblocking terminal position.

6. A shutter mechanism in accordance with claim 5 wherein said ear is pivotally mounted on said release slide and said last-named means includes resilient means effective to resiliently urge said first blade toward its blocking terminal position whereby said further manual operation of said cocking means is effective to insure the establishment of a complete magnetic circuit between said keeper means and said pole piece.

7. A shutter mechanism in accordance with claim 6 including:
   (a) spring means urging said release slide in the direction opposite to said one direction; and
   (b) an element pivotally mounted on said housing and having a latch portion engageable by said release slide when the latter has been moved in said one direction beyond the point at which said first blade is caused to reach its blocking terminal position for releasably retaining said release slide beyond said point.

8. In a camera having a housing and an exposure aperture, a shutter mechanism comprising:
   (a) a shutter blade movable on said housing and having a blocking position and an unblocking position relative to said exposure aperture for controlling the passage of incident light therethrough;
   (b) bias means associated with said shutter blade for urging the same toward its blocking terminal position;
   (c) keeper means on said shutter blade;
   (d) a solenoid operably associated with a pole piece and so mounted on said housing that the engagement of said keeper means with said pole piece defines the unblocking terminal position of said blade and completes therewith a magnetic circuit such that energization of said solenoid is effective to create a magnetic force on said keeper sufficient to maintain said shutter blade in its unblocking terminal position against the action of the bias means associated therewith; and
   (e) manually operable means for moving said shutter blade to its unblocking terminal position including resilient means effective to overcome the bias means associated with said shutter blade and retain the latter in unblocking terminal position prior to energization of said solenoid.

9. A shutter mechanism in accordance with claim 8 wherein said manually operable means includes:
(a) release means mounted on said housing for movement in one direction at least until said shutter blade is in unblocking terminal position;
(b) an ear mounted on said release means for movement relative thereto;
(c) said resilient means being connected between said release means and said ear; and
(d) manually operable cocking means for moving said release means in said one direction beyond the point at which said shutter blade is in unblocking terminal position whereby said resilient means is effective to insure the establishment of a complete magnetic circuit between said keeper means and said pole piece.

10. A shutter mechanism in accordance with claim 9 including:
(a) spring means urging said release means in the direction opposite to said one direction; and
(b) an element having a latch portion engageable by said release means when the latter has been moved in said one direction beyond the point at which said shutter blade is caused to reach its unblocking terminal position for releasably retaining said release means beyond said point.

11. A shutter mechanism in accordance with claim 10 including:
(a) means to substantially simultaneously energize said solenoid and disengage said latch portion from said release means for effecting movement of said release means in a direction opposite to said one direction and maintenance of said shutter blade in its unblocking position;
(b) means normally blocking said exposure aperture but responsive to the last-mentioned movement of said release means to unblock said exposure aperture for initiating exposure; and
(c) means to deenergize said solenoid after a period of time dependent upon the level of scene brightness for effecting movement of said shutter blade to blocking terminal position whereby exposure is terminated.

12. In a camera having a housing and an exposure aperture, a shutter mechanism comprising:
(a) a shutter blade movable on said housing, and having a blocking terminal position and an unblocking terminal position relative to said aperture for controlling the passage of incident light therethrough;
(b) bias means associated with said blade for urging the same toward its blocking terminal position;
(c) a release slide mounted on said housing for sliding movement in opposite directions;
(d) means connecting said release slide to said shutter blade and being constructed and arranged so that movement of said slide in one direction imparts movement to said shutter blade toward its unblocking terminal position and movement of said slide in the opposite direction does not impart movement to said shutter blade toward its blocking terminal position;
(e) keeper means on said shutter blade;
(f) a solenoid operably associated with a pole piece and so mounted on said housing that the engagement of said keeper means with said pole piece defines the unblocking terminal position of said blade and completes therewith a magnetic circuit such that energization of said solenoid is effective to create a magnetic force on said keeper sufficient to maintain said shutter blade in its unblocking terminal position against the action of the bias means associated therewith;
(g) manually operable cocking means for moving said release slide in said one direction at least until said shutter blade is in its unblocking terminal position;
(h) spring means urging said release means in said opposite direction;
(i) latch means releasably engageable by said release slide to releasably retain said release slide in such a position that said shutter blade is in its unblocking terminal position;
(j) a voltage sensitive trigger circuit for energizing and deenergizing said solenoid;
(k) means to substantially simultaneously cause said trigger circuit to energize said solenoid and disengage said latch means from said release slide for effecting movement of said release slide in said opposite direction under the action of said spring means and maintenance of said shutter blade in its unblocking terminal position;
(l) a timing circuit, which when activated, produces a trigger voltage in a period of time that is dependent upon the level of brightness of a scene being photographed;
(m) an element movable in response to initial movement of said release slide for activating said timing circuit;
(n) another shutter blade normally blocking said exposure aperture but responsive to the last-mentioned movement of said element to unblock said exposure aperture for initiating exposure; and
(o) said voltage sensitive trigger circuit being responsive to said trigger voltage for deenergizing said solenoid and effecting movement of the first-mentioned shutter blade to its blocking terminal position whereby exposure is terminated after a period of time dependent on the level of scene brightness.

13. In a camera having a housing and an exposure aperture, a shutter mechanism comprising:
(a) first and second shutter blades movable on said housing, each blade having a blocking terminal position and an unblocking terminal position relative to said aperture for controlling the passage of incident light therethrough;
(b) bias means associated with each of said blades for urging the first blade toward its unblocking terminal position and the second blade toward its blocking terminal position;
(c) a release slide mounted on said housing for sliding movement in opposite directions;
(d) an ear on said release slide engageable with said first blade to move the latter toward its blocking position against the action of the bias means associated therewith when said slide is moved in one direction;
(e) manually operable cocking means for moving said release slide in said one direction at least until said first blade reaches its blocking terminal position;
(f) means on said first blade engageable with said second blade to move the latter to its unblocking terminal position when said first blade is moved to its blocking terminal position;
(g) keeper means on said second blade;
(h) a solenoid operably associated with a pole piece and so mounted on said housing that said keeper means engages said pole piece and completes therewith a magnetic circuit when said second blade is in its unblocking terminal position whereby energization of said solenoid creates a magnetic force on said keeper that is sufficient to maintain said second blade in its unblocking terminal position;
(i) spring means urging said release slide in the direction opposite to said one direction;
(j) a first element pivotally mounted on said housing and having a latch portion engageable with said release slide for releasably holding the latter in a position such that said first blade is in its terminal blocking position and said second blade is in its terminal unblocking position;

(k) a voltage sensitive trigger circuit for energizing and deenergizing said solenoid;

(l) means for substantially simultaneously causing said trigger circuit to energize said solenoid and pivot said first element out of engagement with said release slide for effecting movement of the latter in the direction opposite to said one direction and causing the solenoid to maintain said second blade in its unblocking terminal position;

(m) a second element pivotally mounted on said housing and engageable by said first blade for preventing movement of said first blade to its unblocking terminal position;

(n) means on said second element cooperable with said release slide after predetermined movement thereof in the direction opposite to said one direction for causing the last-mentioned movement of said slide to pivot said second element and release said first blade whereby the latter moves to an unblocking position and initiates exposure;

(o) a timing circuit, which when activated, produces a trigger voltage in a period of time dependent upon the level of brightness of a scene being photographed;

(p) means responsive to pivotal movement of said second element for activating said timing circuit; and (q) said voltage sensitive trigger circuit being responsive to the trigger voltage produced by said timing circuit for deenergizing said solenoid whereby said second shutter blade is released and moves to a blocking position at which exposure is terminated.

14. In a camera having a housing and an exposure aperture, a shutter mechanism comprising:

(a) first and second shutter blades movable on said housing, each blade having a blocking terminal position and an unblocking terminal position relative to said aperture for controlling the passage of incident light therethrough;

(b) bias means associated with each of said blades for urging the first blade toward its unblocking terminal position and the second blade toward its blocking terminal position;

(c) a release slide mounted on said housing for sliding movement in opposite directions;

(d) a first element for releasably maintaining said release slide in one position;

(e) ear means on said slide for maintaining said first blade in its blocking terminal position when said slide is in said one position;

(f) means on said first blade for maintaining said second blade in its unblocking terminal position when said first blade is in its blocking terminal position;

(g) keeper means on said second blade;

(h) a solenoid operably associated with a pole piece and so mounted on said housing that said keeper means engages said pole piece and completes therewith a magnetic circuit when said second blade is in its unblocking terminal position whereby energization of said solenoid creates a magnetic force on said keeper that is sufficient to maintain said second blade in its unblocking terminal position;

(i) means to substantially simultaneously release said first element from said slide and energize said solenoid whereby the latter is effective to maintain said second blade in its unblocking terminal position;

(j) spring means acting on said slide effective to move the same after release by said first element whereby said ear means is no longer effective to maintain said first blade in its blocking terminal position;

(k) a second element pivotally mounted on said housing and having a normal position effective to prevent movement of said first blade to its unblocking terminal position;

(l) a timing circuit, which when activated, generates a trigger voltage after a period of time dependent upon the level of scene brightness;

(m) said second element being constructed and arranged so that a predetermined movement of said release slide from said one position causes said second element to pivot out of its normal position and effect movement of said first blade to its unblocking terminal position whereby exposure is initiated;

(n) means responsive to pivotal movement of said second element out of its normal position for activating said timing circuit; and (o) means responsive to the trigger voltage generated by said timing network for deenergizing said solenoid whereby said second blade is released by the solenoid and terminates exposure.

References Cited by the Examiner

UNITED STATES PATENTS 2,267,794  12/41  Kosken _____ 95—55

NORTON ANSHER, *Primary Examiner.*

JOHN M. HORAN, *Examiner.*